(12) United States Patent
Bishop et al.

(10) Patent No.: US 10,176,228 B2
(45) Date of Patent: Jan. 8, 2019

(54) IDENTIFICATION AND EVALUATION OF LEXICAL ANSWER TYPE CONDITIONS IN A QUESTION TO GENERATE CORRECT ANSWERS

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Nirav P. Desai, Austin, TX (US); Stanley J. Vernier, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 14/565,672

(22) Filed: Dec. 10, 2014

(65) Prior Publication Data

US 2016/0170989 A1   Jun. 16, 2016

(51) Int. Cl.
*G06F 17/30* (2006.01)

(52) U.S. Cl.
CPC .... *G06F 17/3053* (2013.01); *G06F 17/30345* (2013.01); *G06F 17/30401* (2013.01); *G06F 17/30528* (2013.01)

(58) Field of Classification Search
CPC ........ G06F 17/30864; G06F 17/30867; G06Q 30/02
USPC ....... 707/723, 738, 780, 776, 748, 713, 739; 705/27.2
See application file for complete search history.

(56) References Cited

U.S. PATENT DOCUMENTS

| | | | |
|---|---|---|---|
| 5,884,302 A | 3/1999 | Ho | |
| 7,058,564 B2 | 6/2006 | Ejerhed | |
| 8,655,866 B1* | 2/2014 | Provine | G06F 17/30864 |
| | | | 706/14 |
| 9,336,269 B1* | 5/2016 | Smith | G06F 17/30424 |
| 2003/0217052 A1* | 11/2003 | Rubenczyk | G06F 17/30643 |
| 2004/0249796 A1* | 12/2004 | Azzam | G06F 17/3043 |
| 2005/0086592 A1* | 4/2005 | Polanyi | G06F 17/30719 |
| | | | 715/254 |
| 2005/0278325 A1* | 12/2005 | Mihalcea | G06F 17/277 |
| 2006/0095466 A1* | 5/2006 | Stevens | G06F 17/30398 |
| 2007/0288839 A1* | 12/2007 | Kurosawa | G06F 17/241 |
| | | | 715/751 |
| 2008/0097748 A1* | 4/2008 | Haley | G06F 17/2785 |
| | | | 704/9 |
| 2009/0228299 A1 | 9/2009 | Kangarloo et al. | |
| 2009/0292687 A1* | 11/2009 | Fan | G06F 17/30654 |

(Continued)

FOREIGN PATENT DOCUMENTS

WO   2012040350   3/2012

*Primary Examiner* — Jeff A Burke
*Assistant Examiner* — Thong Vu
(74) *Attorney, Agent, or Firm* — VanLeeuwen & VanLeeuwen; Diana R. Gerhardt (57) ABSTRACT

An approach is provided in which a knowledge manager receives a question and selects candidate answers based upon a lexical answer type included in the question. The knowledge manager evaluates the candidate answers against conditions detected in the question and generates condition fulfillment scores accordingly. In turn, the knowledge manager ranks the candidate answers based upon the corresponding condition fulfillment scores.

14 Claims, 8 Drawing Sheets

(56) References Cited

U.S. PATENT DOCUMENTS

| | | | | |
|---|---|---|---|---|
| 2010/0100546 A1* | 4/2010 | Kohler | ............ | G06F 17/30017 707/739 |
| 2011/0191211 A1* | 8/2011 | Lin | ............ | G06F 17/30265 705/27.2 |
| 2012/0077178 A1* | 3/2012 | Bagchi | ............ | G09B 7/00 434/362 |
| 2012/0078873 A1* | 3/2012 | Ferrucci | ............ | G06F 17/30654 707/708 |
| 2012/0078889 A1* | 3/2012 | Chu-Carroll | ............ | G06F 17/30654 707/723 |
| 2012/0330869 A1* | 12/2012 | Durham | ............ | G06N 5/022 706/16 |
| 2012/0330921 A1 | 12/2012 | Ferrucci et al. | | |
| 2013/0041921 A1* | 2/2013 | Cooper | ............ | G06F 17/30672 707/780 |
| 2013/0066873 A1* | 3/2013 | Salvetti | ............ | G06Q 30/0278 707/738 |
| 2013/0173256 A1* | 7/2013 | Eggebraaten | ............ | G06F 17/28 704/9 |
| 2014/0006012 A1* | 1/2014 | Zhou | ............ | G06F 17/30654 704/9 |
| 2014/0189484 A1* | 7/2014 | Fountenberry | ............ | G06F 17/2229 715/229 |
| 2014/0201217 A1 | 7/2014 | Hatami-Hanza | | |
| 2014/0297264 A1* | 10/2014 | Etzioni | ............ | G06F 17/2705 704/9 |
| 2014/0359421 A1* | 12/2014 | Allen | ............ | G06F 17/241 715/230 |
| 2014/0365502 A1* | 12/2014 | Haggar | ............ | G06N 5/02 707/748 |
| 2015/0286747 A1* | 10/2015 | Anastasakos | ............ | G06F 17/30917 707/776 |
| 2016/0034457 A1* | 2/2016 | Bradley | ............ | G06F 17/3043 707/749 |
| 2016/0098383 A1* | 4/2016 | Contreras | ............ | G06F 17/30551 705/3 |
| 2016/0117360 A1* | 4/2016 | Kunc | ............ | G06F 17/30401 707/730 |

* cited by examiner

CONDITION TYPES

| CONDITION ANNOTATOR | PATTERN | DESCRIPTION |
|---|---|---|
| Containment Condition Annotator | <LAT+NOUN1> in the <NOUN2> | Implies a containment type condition where the answer must exist within the entity specified by <NOUN2>. |
| Spatial Proximity Condition Annotator | <LAT> above/below/next to the <NOUN> | Implies a spatial relationship condition where the answer must be located in the correct spatial relationship to the <NOUN> |
| Color condition Annotator | <color> <LAT> | Implies the answer must possess the color attribute described by <color>. |
| UMLS Containment Condition Annotator | <LAT+UMLS Concept Noun> in <UMLS Concept Noun> | Implies a UMLS containment condition where UMLS would be used to evaluate if one concept contained the other concept. |

IDENTIFICATION AND EVALUATION OF LEXICAL ANSWER TYPE CONDITIONS IN A QUESTION TO GENERATE CORRECT ANSWERS

BACKGROUND

A question answer system answers questions posed in a natural language format by applying advanced natural language processing, information retrieval, knowledge representation, automated reasoning, and machine learning technologies. Question answer systems differ from typical document search technologies because document search technologies generate a list of documents ranked in order of relevance based on a word query, whereas question answer systems analyze contextual details of a question expressed in a natural language and provide a precise answer to the question.

Many natural language questions include conditions for which current question answer systems find difficult to interpret. As such, current question answer systems may provide incorrect answers due to text similarity between a question and a document passage.

BRIEF SUMMARY

According to one embodiment of the present disclosure, an approach is provided in which a knowledge manager receives a question and selects candidate answers based upon a lexical answer type included in the question. The knowledge manager evaluates the candidate answers against conditions detected in the question and generates condition fulfillment scores accordingly. In turn, the knowledge manager ranks the candidate answers based upon the corresponding condition fulfillment scores.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
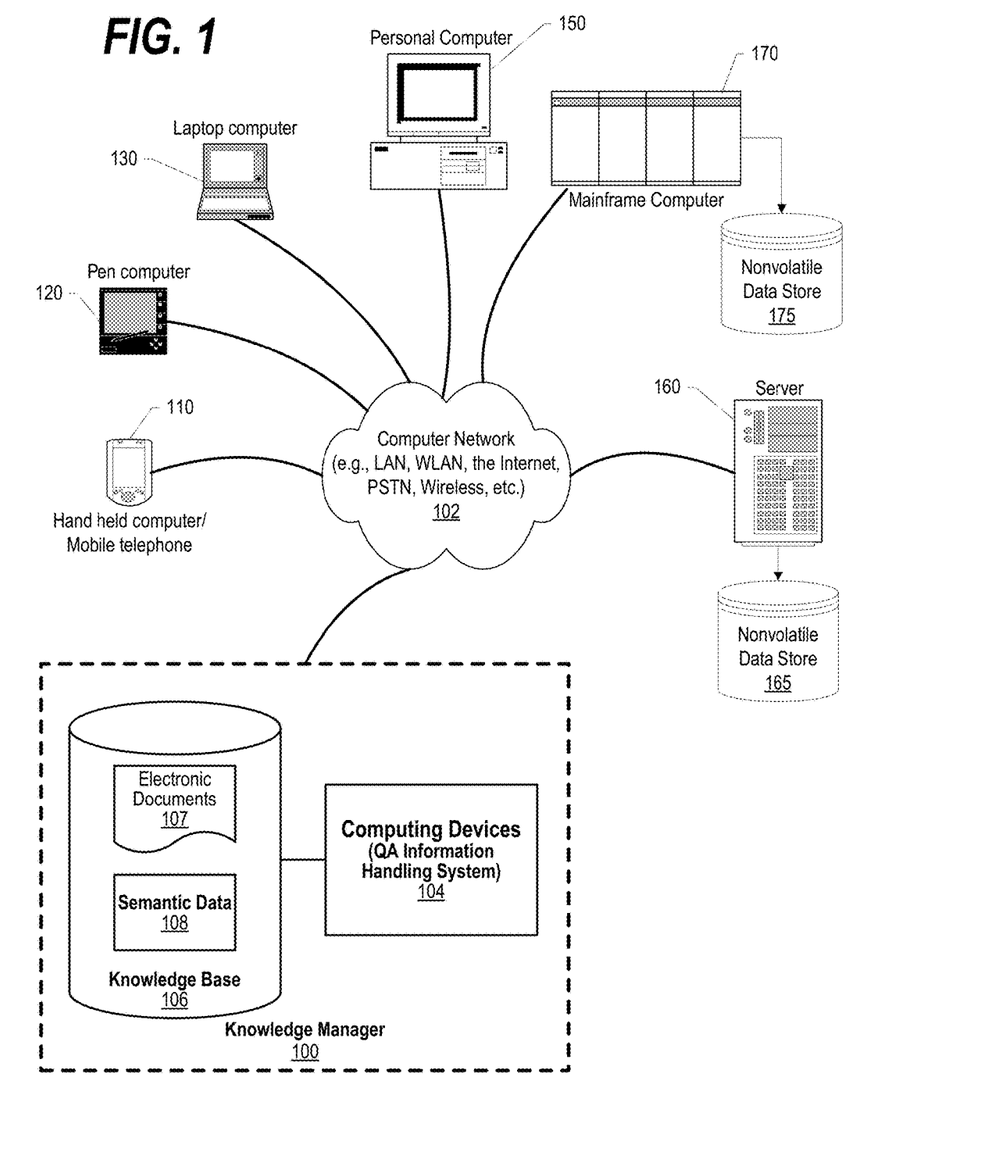
FIG. 1 depicts a schematic diagram of one illustrative embodiment of a knowledge manager system in a computer network.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
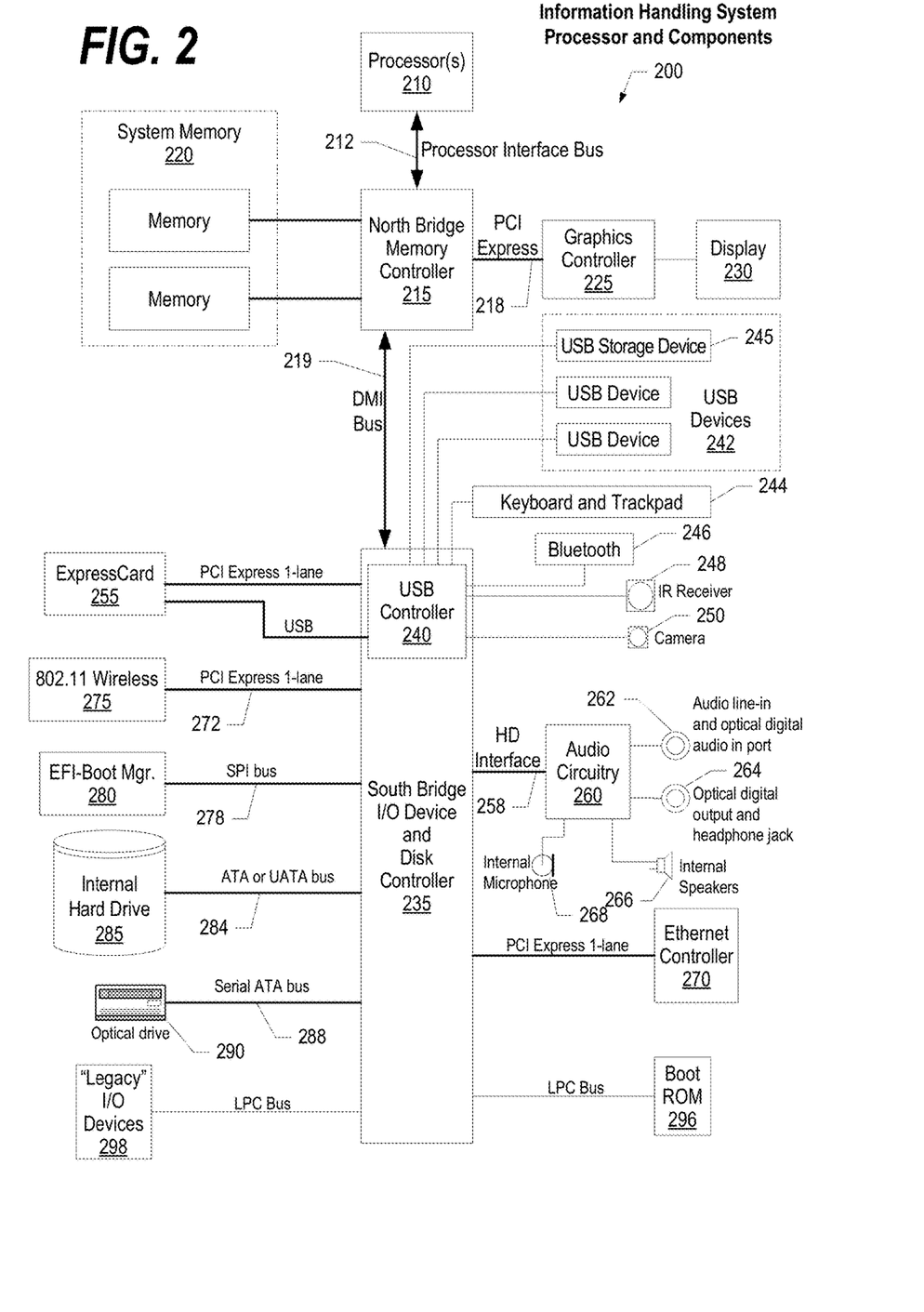
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. The information handling system receives a question and applies natural language processing techniques to the question to identify a word or words in the question that semantically represents an answer to the question, referred to as a lexical answer type (LAT). The information handling system includes condition annotators that add annotations to conditions in the question imposing fulfillment requirements on candidate answers corresponding to the lexical answer type. The information handling system generates condition fulfillment scores for the candidate answers by comparing the candidate answers to the conditions. In turn, the information handling system ranks the candidate answers based upon their corresponding condition fulfillment scores.

Figure 3:
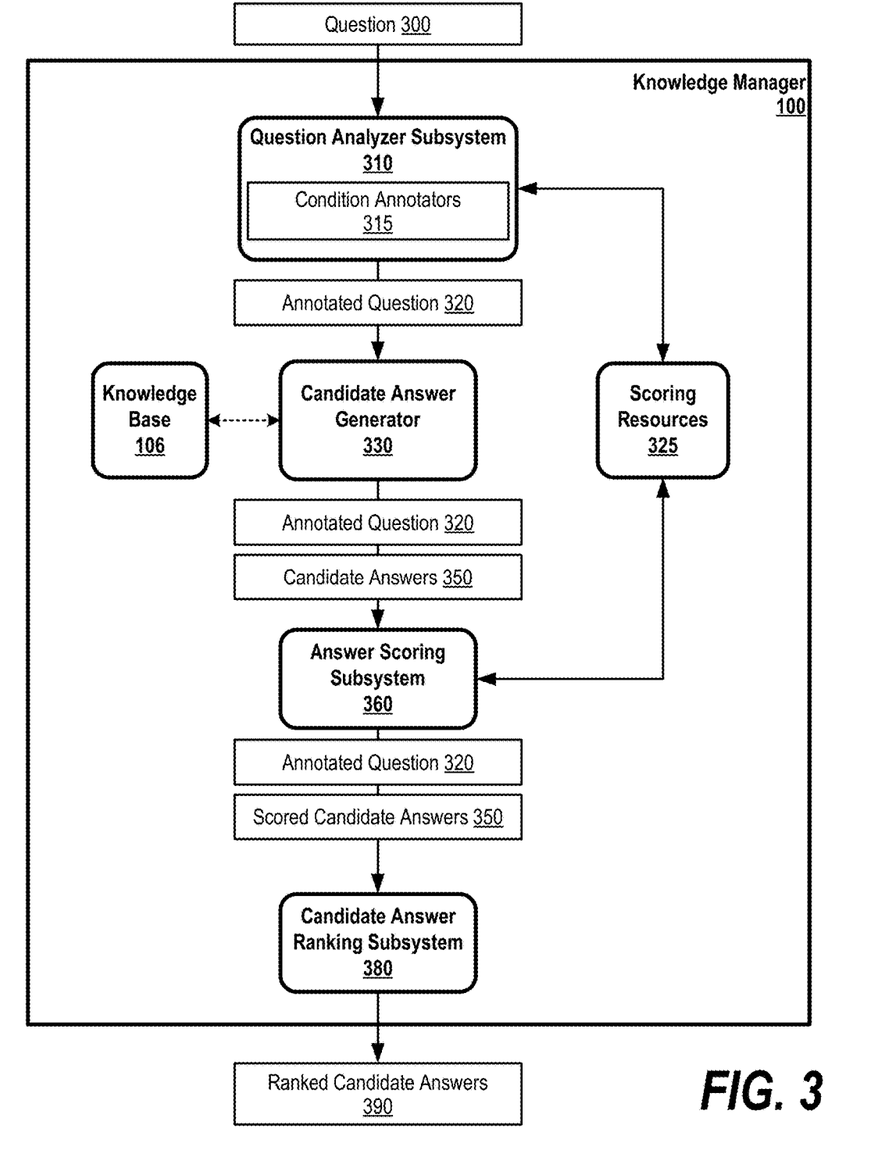
FIG. 3 is an exemplary diagram depicting a knowledge manager scoring candidate answers based upon their correctness relative to conditions included in the question.

FIG. 3 is an exemplary diagram depicting a knowledge manager scoring candidate answers based upon their correlation to, or ability to fulfill, conditions included in the question. Knowledge manager 100 receives question 300 and uses question analyzer subsystem 310 to understand the context of question 300, such as by using natural language processing techniques.

Question analyzer subsystem 310 identifies a lexical answer type (e.g., word or words) in question 300, which semantically represents an answer to the question. In turn, question analyzer subsystem 310 adds an annotation to question 300 based upon annotations included in scoring resources 325 (e.g., a storage area). For example, if question 300 is "What is the smallest bone in the leg?" a unified medical language system (UMLS) annotator includes code that recognizes that the word "bone" is the lexical answer type and corresponds to an annotation in scoring resources 325 (see FIG. 5 and corresponding text for further details).

Question analyzer subsystem 310 includes condition annotators 315, which search for a word or words in question 300 that impose one or more requirements on answers to question 300. Using the same question above, condition annotators 315 recognize that "in" implies a containment condition and determines that "leg" corresponds to an annotation in scoring resources 325. As such, question analyzer subsystem 310 recognizes the pattern of UMLS+LAT (over bone)+the word "in" and target UMLS (over leg) and annotates question 300 accordingly, resulting in annotated question 320. In one embodiment, question analyzer subsystem 310 treats "smallest" as a condition and, in this embodiment, scores candidate answers accordingly based upon their relevance to smallest and leg (discussed below).

Candidate answer generator 330 searches knowledge base 106 for document passages that correspond to the lexical answer type. For example, candidate answer generator 330 may locate medical articles in knowledge base 106 that discuss the size of bones. In turn, candidate answer generator 330 generates candidate answers 350 based upon the search results.

In one embodiment, the knowledge manager 106 annotates the documents in knowledge base 106 during a document ingestion stage. In this embodiment, candidate answer generator 330 compares the annotations in the documents with the lexical answer type to identify candidate passages. For example, knowledge base 106 may include document passages of "The stapes is the smallest bone in the body" and "The shortest bone in the leg is the fibula," both of which were annotated during document ingestion. In this example, candidate answer generator 330 matches the stapes annotation and the fibula annotation with the bone lexical answer type annotation (see FIG. 6 and corresponding text for further details).

Answer scoring subsystem 360 evaluates candidate answers 350 against the conditions included in annotated question 320 and scoring information included in scoring resources 325 to generate condition fulfillment scores for candidate answers 350. In one embodiment, the scores range from 0-1 based upon the degree of confidence to which answer scoring subsystem 360 determines that a candidate answer fulfills the question for the particular condition. For example, a passage scorer that measures how closely the question matches to a passage corresponding to a candidate answer might evaluate that passage "The stapes is the smallest bone in the body" against the question "What is the smallest bone in the leg?" The passage score may provide the candidate answer of "stapes" a score of 0.75 because 75% of the passage's words line up. However, a condition evaluator scorer provides a candidate answer of 0.0 to "stapes" because the condition evaluator scorer determined that the stapes is not in the leg based upon knowledge base 106. On the other hand, the condition evaluator scorer provides a candidate answer of 1.0 to "fibula" because the condition evaluator scorer determined that the fibula is contained in the leg based on knowledge base 106.

Figure 8:
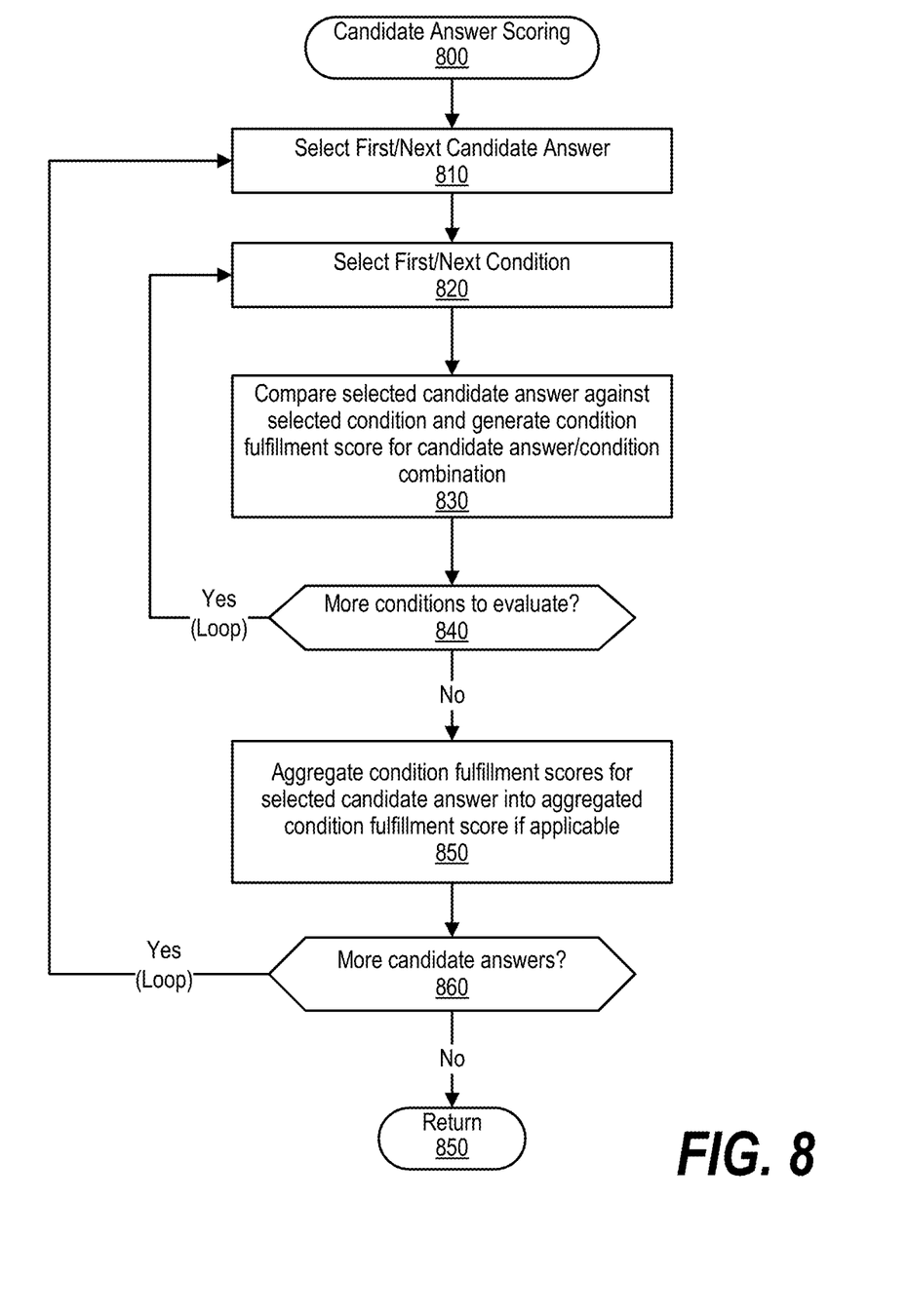
FIG. 8 is an exemplary flowchart showing steps taken by a knowledge manager to score candidate answers based upon a correlation between the candidate answers and conditions included in a question.

In one embodiment when annotated question 320 includes multiple condition annotations, answer scoring subsystem 360 computes a candidate answer's condition fulfillment score for each condition annotation and then aggregates the multiple condition fulfillment scores into an aggregated condition fulfillment score for the candidate answer (see FIG. 8 and corresponding text for further details). In another embodiment, candidate answer ranking system 380 aggregates multiple scores across many different ways of measuring the correctness of an answer and treats each condition fulfillment score as an individual score (discussed below).

Candidate answer ranking subsystem 380 receives annotated questions 320 and scored candidate answers 350 from answer scoring subsystem 360. Candidate answer ranking subsystem 380, in one embodiment, ranks scored candidate answers 350 based upon their corresponding condition fulfillment score and other scores, such as scores based on text similarity, bigram similarity, etc. In turn, candidate answer ranking 380 provides ranked candidate answers 390, for example, to a user by displaying ranked candidate answers 390 on a display.

In one embodiment, knowledge manager 100 undergoes a machine learning process that creates a model using the condition fulfillment scores. In this embodiment, knowledge manager 100 applies the model at runtime to assist knowledge manager 100 to rank scored candidate answers 350 based on the combination of various scores and patterns identified during the machine learning process. For example, during the machine learning process, the model learns that candidate answers receiving a high condition fulfillment score were the candidate answers that were actually correct. As such, knowledge manager 100 applies a higher weighting to a candidate answer's condition fulfillment score relative to other scores corresponding to the candidate answer.

Figure 4:
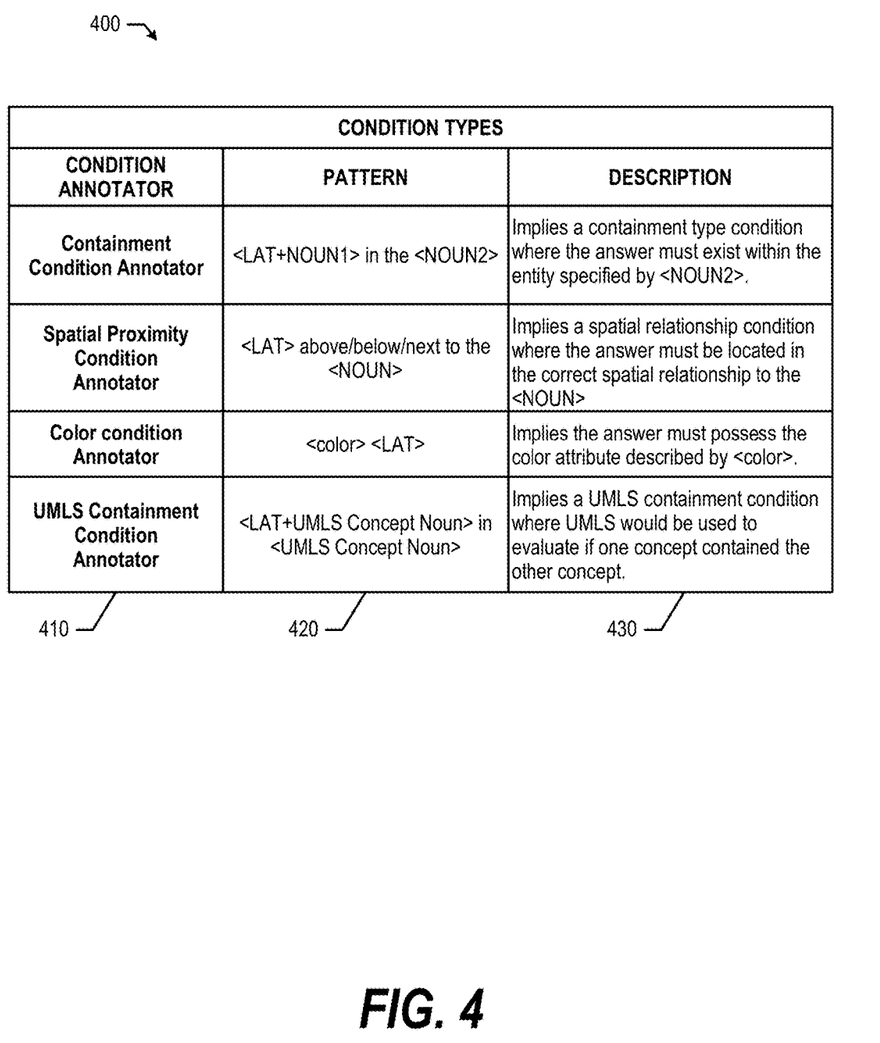
FIG. 4 is an exemplary diagram showing a list of condition annotators and word patterns for which the condition annotators search in a question.

FIG. 4 is an exemplary diagram showing a list of condition annotators and word patterns for which they search in a question. As those skilled in the art can appreciate, knowledge manager 100 may utilize more, less, or different condition annotators than what is shown in table 400. For example, knowledge manager 100 may utilize condition annotators that search for grammatical patterns, patterns referencing other ontologies, domain-specific patterns, etc.

Table 400 lists four condition annotators in column 410, which are a containment condition annotator, a spatial proximity condition annotator, a color condition annotator, and a UMLS containment condition annotator. Column 420 shows syntax for which the corresponding condition annotators search a question to determine whether the question includes a particular condition. For example, a color condition annotator determines that the question "What red flower grows in Montana?" includes a color condition of "red" for the LAT of "flower." Column 430 provides descriptions and implications of the various conditions.

Figure 5:
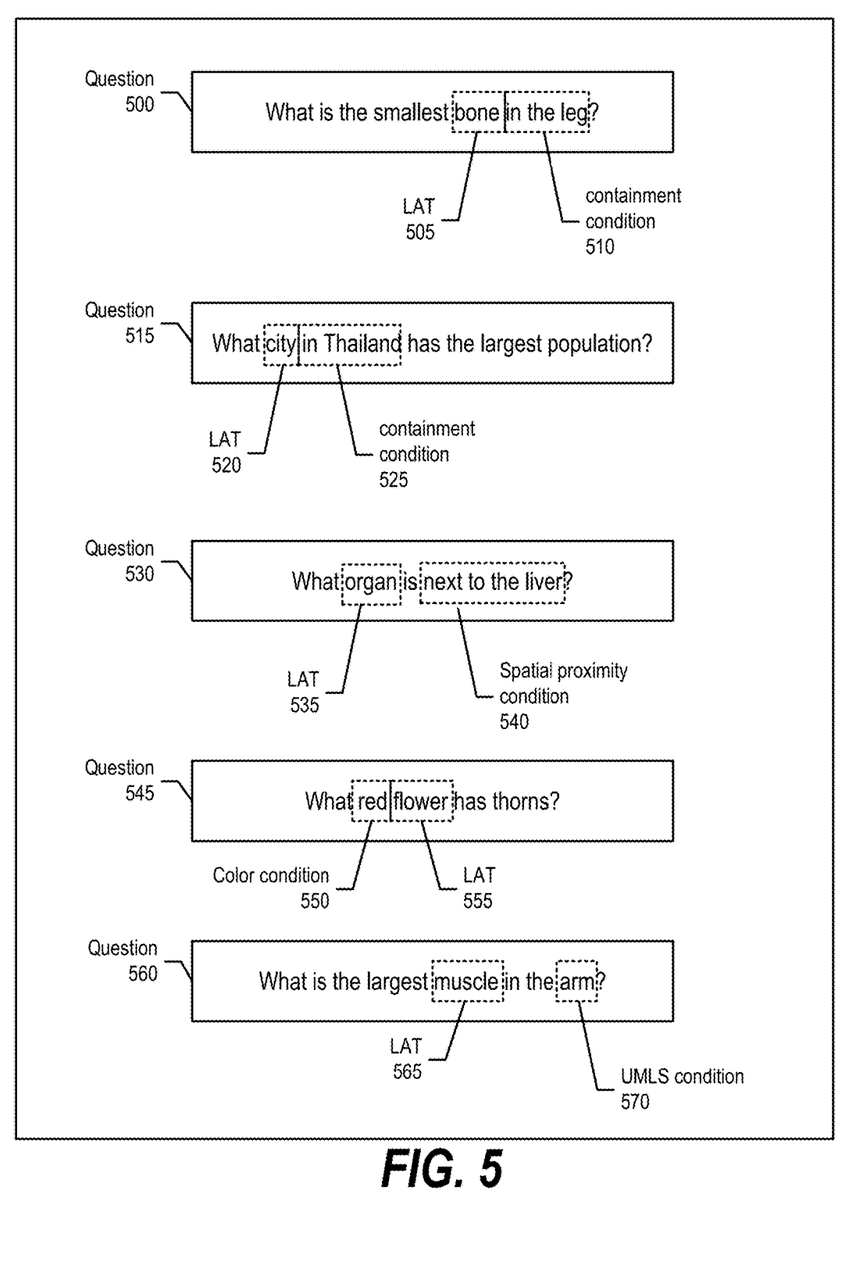
FIG. 5 is a diagram showing exemplary questions that include lexical answer types and corresponding conditions.

FIG. 5 is a diagram showing exemplary questions that include lexical answer types and corresponding conditions. Question 500 includes LAT 505 and containment condition 510. As such, a candidate answer that corresponds to a bone in the leg receives a high condition fulfillment score because it correlates to containment condition 510. Question 515 includes LAT 520 and containment condition 525. As such, a candidate answer that corresponds to a city in Thailand receives a high condition fulfillment score compared with a candidate answer that corresponds to a city not in Thailand.

Question 530 includes LAT 535 and spatial proximity condition 540. As such, a candidate answer that corresponds to an organ next to the liver receives a high condition fulfillment score compared with a candidate answer that corresponds to an organ not in proximity to the liver. Question 545 includes color condition 550 and LAT 555. As such, a candidate answer that corresponds to a red flow receives a high condition fulfillment score compared with a candidate answer that corresponds to a different color flower. Question 560 includes LAT 565 and UMLS condition 570. As such, a candidate answer that corresponds to a muscle in the arm receives a high condition fulfillment score compared with a candidate answer that corresponds to a muscle in a different part of the body.

Figure 6:
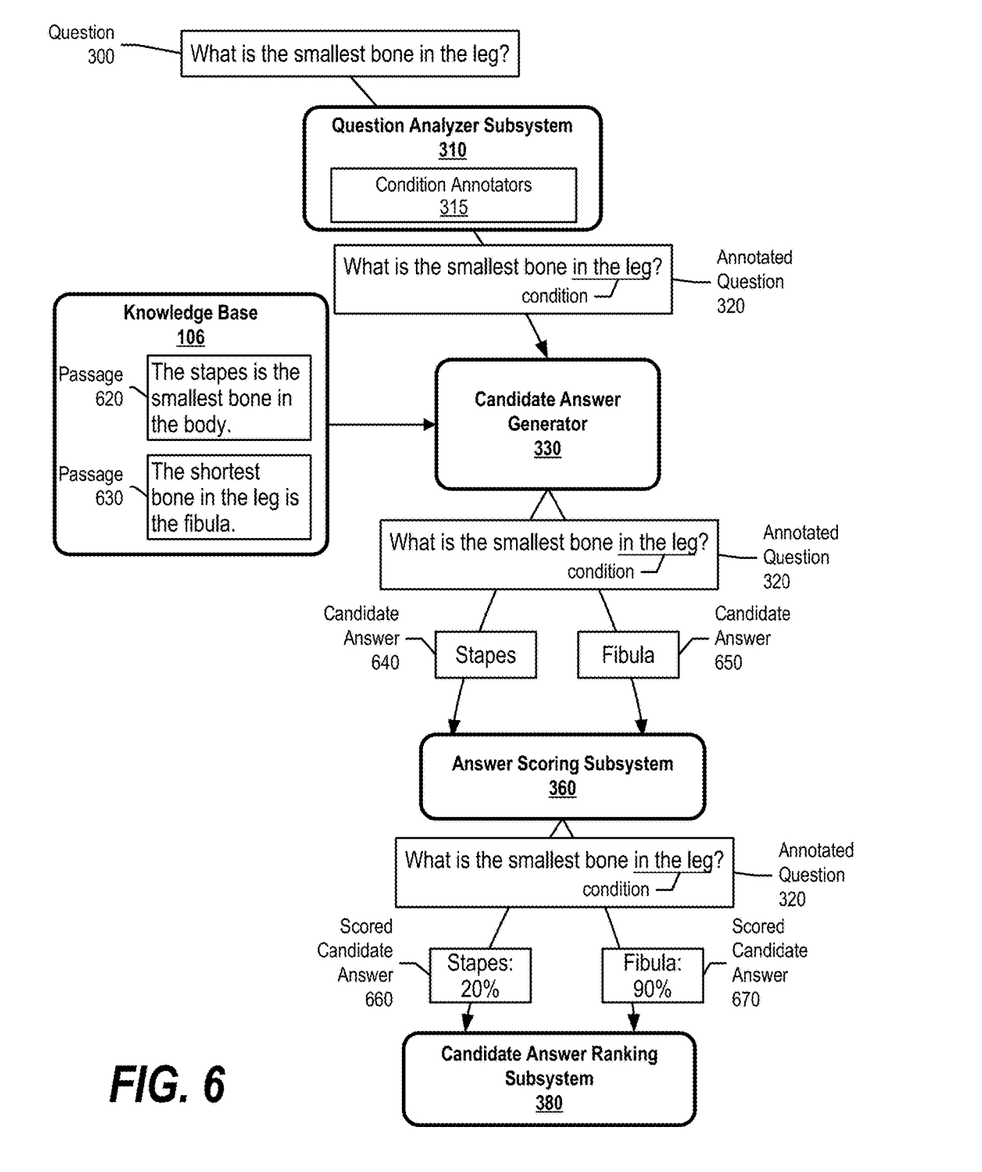
FIG. 6 is an exemplary diagram depicting a knowledge manager applying condition annotations to conditions in a question and ranking candidate answers based upon a correlation between the candidate answers and the conditions.

FIG. 6 is an exemplary diagram depicting a knowledge manager adding annotations to conditions included in a question and ranking candidate answers based upon how well the candidate answers fulfill the conditions.

Question analyzer subsystem 310 receives question 300 and uses condition annotators 315 to annotate question 300. One of condition annotators 310 is a containment condition annotator and determines that "in the leg" is a containment condition that corresponds to the LAT of "bone."

As such, candidate answer generator 330 discovers passage 620 and passage 630 in knowledge base 106, which both correspond to the LAT. In turn, candidate answer generator 330 generates candidate answers 640 and 650 accordingly. Answer scoring subsystem 360 evaluate candidate answers 640 and 650 against the containment condition in annotated question 320. In one embodiment, answer scoring subsystem 360 uses programmed logic and data in the scoring resources to determine a score. The logic depends on the data available in the scoring resource and what type of condition the scorer is evaluating (e.g., containment condition).

Candidate answer ranking subsystem 380 receives scored candidate answers 660 and 670 and ranks them based upon their corresponding condition fulfillment scores and other scores utilized by knowledge manager 100 to improve candidate answer ranking capabilities, such as those based on text similarity bigram similarity, etc.

Figure 7:
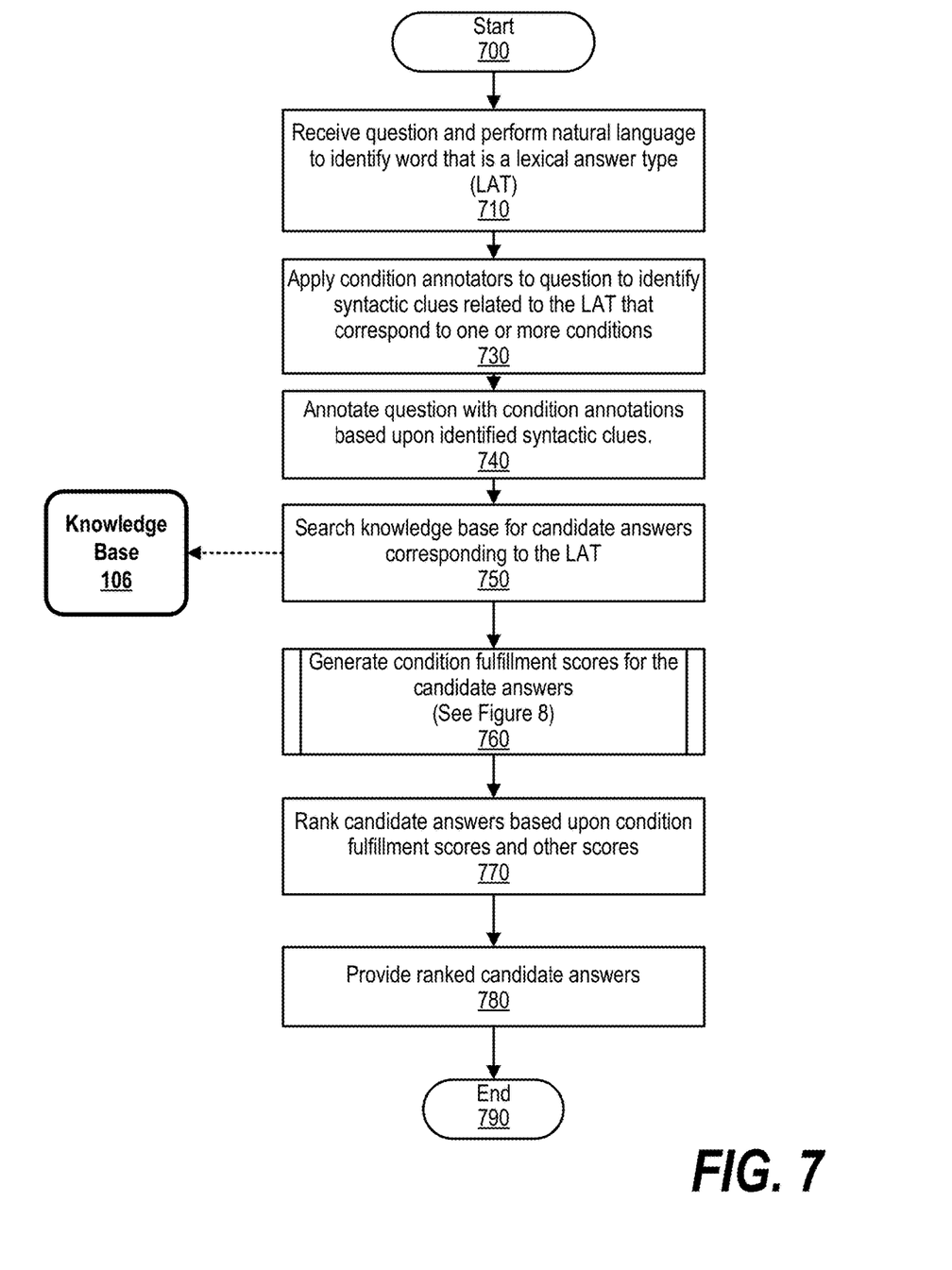
FIG. 7 is an exemplary flowchart depicting steps taken by a knowledge manager to rank candidate answers to a questions based upon conditions included in the question.

FIG. 7 is an exemplary flowchart depicting steps taken by a knowledge manager to rank candidate answers to a questions based upon conditions included in the question. Processing commences at 700, whereupon the process receives a question and performs natural language processing on the question to identify a word in the question that is the lexical answer type (step 710).

Next, at step 730, the process applies condition annotators 315 to the question to identify syntactic clues related to the LAT that correspond to one or more conditions, such as "in," "next to," etc.

At step 740, the process annotates the question with condition annotations based upon the identified syntactic clues. For example, syntactic clues may trigger containment condition annotators, spatial proximity condition annotators, color condition annotators, UMLS containment condition annotators, or other type of condition annotators to add annotations to the question.

At step 750, the process searches knowledge base 106 to identify document passages corresponding to the lexical answer type. In one embodiment, knowledge base 106 is a domain-specific knowledge base that includes annotated documents ingested from trusted sources corresponding to the domain.

At predefined process 760, the process generates condition fulfillment scores for the candidate answers. In one embodiment, the process aggregates multiple condition fulfillment scores for a candidate answer for multiple conditions into an aggregated condition fulfillment score (see FIG. 8 and corresponding text for processing details).

At step 770, the process ranks the candidate answers based upon the condition fulfillment scores and other scores as described herein. At step 780, the process provides the ranked candidate answers, such as to a user via a display screen, and FIG. 7 processing thereafter ends at 790.

FIG. 8 is an exemplary flowchart showing steps taken by a knowledge manager to score candidate answers based upon how well the candidate answers fulfill conditions included in a question. Processing commences at 800, whereupon the process selects a first candidate answer at step 810. At step 820, the process selects a first condition based upon condition annotations included in annotated question 320.

The process compares the selected candidate answer against the selected condition and generates a condition fulfillment score, such as described herein, for the candidate answer/condition combination (step 830).

The process determines whether there are more conditions in the question for which to evaluate against the selected candidate answer (decision 840). If there are more conditions to evaluate, decision 840 branches to the 'yes' branch, which loops back to select and generate a condition fulfillment score for the selected candidate answer. This looping continues until there are no more conditions to evaluate against the selected candidate answer, at which point decision 640 branches to the "No" branch, whereupon the process aggregates the condition fulfillment scores into an aggregated condition fulfillment score for the selected candidate answer.

The process determines whether there are more candidate answers for which to compare against the conditions (decision 860). If there are more candidate answers to evaluate, decision 860 branches to the 'yes' branch, which loops back to select and process the next candidate answer. This looping continues until there are no more candidate answers to evaluate, at which point decision 860 branches to the 'no' branch, whereupon processing returns to FIG. 7 at 850.

As those skilled in the art can appreciate, the process may utilize a different loop structure than what is shown in FIG. 5. For example, the process may select a first condition and then evaluate each candidate answer against the first condition, select a second condition and evaluate each candidate answer against the second condition, and etcetera.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a question that includes a logical answer type;
   identifying, by a processor, one or more terms in the question that impose one or more requirements of the question, wherein the one or more terms are different from the logical answer type;
   annotating the question, by the processor, by adding one or more condition annotations to the question that correspond to the one or more requirements, wherein at least one of the one or more condition annotations are selected from the group consisting of a containment condition annotation, a spatial proximity condition annotation, a color condition annotation, and a UMLS containment condition annotation, resulting in an annotated question;
   selecting, by the processor, one or more candidate answers to the received question based on the lexical answer type;
   generating, by the processor, one or more condition fulfillment scores of the one or more candidate answers based on comparing the one or more candidate answers against the one or more condition annotations included in the annotated question;

ranking, by the processor, the one or more candidate answers based upon the one or more condition fulfillment scores; and providing the ranked one or more candidate answers to a user.

2. The method of claim 1 wherein, prior to discovering the one or more candidate answers, the annotating further comprises:

determining that the one or more terms correspond to the lexical answer type;

identifying the one or more syntactic relationships corresponding to the lexical answer type that indicate a presence of a containment condition corresponding to the lexical answer type; and adding the one or more condition annotations to the question based upon the identified syntactic relationships.

3. The method of claim 1 further comprising:

selecting a first one of the one or more candidate answers and a first condition corresponding to a first one of the one or more condition annotations;

generating a first one of the one or more condition fulfillment scores by comparing the first candidate answer to the first condition;

selecting a second a second condition corresponding to a second one of the one or more condition annotations;

generating a second one of the one or more condition fulfillment scores by comparing the first candidate answer to the second condition;

aggregating the first condition fulfillment score and the second condition fulfillment score into an aggregated condition fulfillment score; and assigning the aggregated condition fulfillment score to the first candidate answer.

4. The method of claim 1 further comprising:

traversing a knowledge base to identify one or more document passages corresponding to the lexical answer type; and generating the one or more candidate answers based upon the identified one or more document passages.

5. The method of claim 1 wherein the lexical answer type corresponds to a word in the question that semantically represents an answer to the question.

6. An information handling system comprising:

one or more processors;

a memory coupled to at least one of the processors; and a set of computer program instructions stored in the memory and executed by at least one of the processors in order to perform actions of:

receiving a question that includes a logical answer type;

identifying, by the processor, one or more terms in the question that impose one or more requirements of the question, wherein the one or more terms are different from the logical answer type;

annotating the question, by the processor, by adding one or more condition annotations to the question that correspond to the one or more requirements, wherein at least one of the one or more condition annotations are selected from the group consisting of a containment condition annotation, a spatial proximity condition annotation, a color condition annotation, and a UMLS containment condition annotation, resulting in an annotated question;

selecting, by the processor, one or more candidate answers to the received question based on the lexical answer type;

generating, by the processor, one or more condition fulfillment scores of the one or more candidate answers based on comparing the one or more candidate answers against the one or more condition annotations included in the annotated question;

ranking, by the processor, the one or more candidate answers based upon the one or more condition fulfillment scores; and providing the ranked one or more candidate answers to a user.

7. The information handling system of claim 6 wherein, prior to discovering the one or more candidate answers, the one or more processors performs additional actions comprising:

determining that the one or more terms correspond to the lexical answer type;

identifying the one or more syntactic relationships corresponding to the lexical answer type that indicate a presence of a containment condition corresponding to the lexical answer type; and adding the one or more condition annotations to the question based upon the identified syntactic relationships.

8. The information handling system of claim 6 wherein the one or more processors perform additional actions comprising:

selecting a first one of the one or more candidate answers and a first condition corresponding to a first one of the one or more condition annotations;

generating a first one of the one or more condition fulfillment scores by comparing the first candidate answer to the first condition;

selecting a second a second condition corresponding to a second one of the one or more condition annotations;

generating a second one of the one or more condition fulfillment scores by comparing the first candidate answer to the second condition;

aggregating the first condition fulfillment score and the second condition fulfillment score into an aggregated condition fulfillment score; and assigning the aggregated condition fulfillment score to the first candidate answer.

9. The information handling system of claim 6 wherein the one or more processors perform additional actions comprising:

traversing a knowledge base to identify one or more document passages corresponding to the lexical answer type; and generating the one or more candidate answers based upon the identified one or more document passages.

10. The information handling system of claim 6 wherein the lexical answer type corresponds to a word in the question that semantically represents an answer to the question.

11. A computer program product stored in a computer readable storage medium, comprising computer program code that, when executed by an information handling system, causes the information handling system to perform actions comprising:

receiving a question that includes a logical answer type;

identifying, by the processor, one or more terms in the question that impose one or more requirements of the question, wherein the one or more terms are different from the logical answer type;

annotating the question, by the processor, by adding one or more condition annotations to the question that correspond to the one or more requirements, wherein at least one of the one or more condition annotations are selected from the group consisting of a containment condition annotation, a spatial proximity condition annotation, a color condition annotation, and a UMLS containment condition annotation, resulting in an annotated question;

selecting, by the processor, one or more candidate answers to the received question based on the lexical answer type;

generating, by the processor, one or more condition fulfillment scores of the one or more candidate answers based on comparing the one or more candidate answers against the one or more condition annotations included in the annotated question;

ranking, by the processor, the one or more candidate answers based upon the one or more condition fulfillment scores; and providing the ranked one or more candidate answers to a user.

12. The computer program product of claim 11 wherein, prior to discovering the one or more candidate answers, the one or more processors performs additional actions comprising:

determining that the one or more terms correspond to the lexical answer type;

identifying the one or more syntactic relationships corresponding to the lexical answer type that indicate a presence of a containment condition corresponding to the lexical answer type; and adding the one or more condition annotations to the question based upon the identified syntactic relationships.

13. The computer program product of claim 11 wherein the one or more processors perform additional actions comprising:

selecting a first one of the one or more candidate answers and a first condition corresponding to a first one of the one or more condition annotations;

generating a first one of the one or more condition fulfillment scores by comparing the first candidate answer to the first condition;

selecting a second a second condition corresponding to a second one of the one or more condition annotations;

generating a second one of the one or more condition fulfillment scores by comparing the first candidate answer to the second condition;

aggregating the first condition fulfillment score and the second condition fulfillment score into an aggregated condition fulfillment score; and assigning the aggregated condition fulfillment score to the first candidate answer.

14. The computer program product of claim 11 wherein the one or more processors perform additional actions comprising:

traversing a knowledge base to identify one or more document passages corresponding to the lexical answer type; and generating the one or more candidate answers based upon the identified one or more document passages.

* * * * *